United States Patent [19]

Butterfield et al.

[11] Patent Number: 5,107,805
[45] Date of Patent: Apr. 28, 1992

[54] CAMSHAFT WITH EXTRA CAM TO INCREASE THE MAGNITUDE OF TORQUE PULSATIONS THEREIN

[75] Inventors: Roger P. Butterfield, Interlaken; J. Christian Haesloop, Rock Stream; Timothy J. Ledvina, Groton; Philip J. Mott, Dryden, all of N.Y.

[73] Assignee: Borg-Warner Automotive Transmission & Engine Components Corporation, Sterling Heights, Mich.

[21] Appl. No.: 732,065

[22] Filed: Jul. 18, 1991

[51] Int. Cl.$^5$ ............................... F01L 1/04
[52] U.S. Cl. ................ 123/90.17; 123/90.31; 123/90.6; 74/567
[58] Field of Search ........... 123/90.15, 90.17, 90.27, 123/90.31, 90.6; 74/567

[56] References Cited

U.S. PATENT DOCUMENTS

| | | | |
|---|---|---|---|
| 3,272,189 | 9/1966 | Turkish | 123/90.6 |
| 4,798,178 | 1/1989 | Greulich et al. | 123/90.6 |
| 4,917,058 | 4/1990 | Nelson et al. | 123/90.17 |
| 4,942,854 | 7/1990 | Shirai et al. | 123/90.17 |
| 5,002,023 | 3/1991 | Butterfield et al. | 123/90.15 |
| 5,040,500 | 8/1991 | Reece | 123/90.27 |

Primary Examiner—E. Rollins Cross
Assistant Examiner—Weilun Lo
Attorney, Agent, or Firm—Willian Brinks Olds

[57] ABSTRACT

A torque amplifying camshaft for operating a valve of each of a plurality of valves of an internal combustion engine, the camshaft having an elongagte shaftlike portion and an engine valve operating cam for each of the valves, the valve operating cams being spaced apart from one another along the shaftlike portion. Each of the engine valve operating cams has an outwardly projecting portion, and the outwardly projecting portions are circumferentially offset from one another about the longitudinal central axis of the camshaft. The camshaft also carries a supplementary cam surface, either in the form of an outwardly facing surface of a separate supplementary cam or an inwardly facing surface of a portion of a drive sprocket which is keyed to the shaftlike portion. The supplementary cam surface is adapted to be followed by a spring biased supplementary cam follower and has portions which introduce torque pulses into the camshaft which are synchronous with and consistently directed with respect to the torque pulses that are introduced into the camshaft by the engagement between the valve operating cams and spring biased followers which engage such valve operating cams.

26 Claims, 6 Drawing Sheets

CAMSHAFT WITH EXTRA CAM TO INCREASE THE MAGNITUDE OF TORQUE PULSATIONS THEREIN

FIELD OF THE INVENTION

This invention relates to the use of cams in mechanical systems. More particularly, this invention relates to a camshaft for an internal combustion engine which increases the magnitude of the normal torque pulses generated in such a system.

BACKGROUND OF THE INVENTION

A camshaft for use in an internal combustion engine of a type having spring loaded cam followers experiences a series of oppositely directed torque pulses during each revolution of the camshaft. The positive-going portion of each pulse occurs as a result of the need to apply torque to the camshaft to cause each of its operating cams to rotate against the force of the cam follower during the opening of the valve which is operated by such cam follower, and the negative-going portion occurs as the result of the application of an oppositely directed torque to the camshaft as the operating cam resists the force of the cam follower during the closing of the valve.

The resulting torque pulses can be used for actuation purposes, e.g., as a means for providing a control signal to a variable cam timing system (VCT) as disclosed in U.S. Pat. No. 5,002,023. The present invention incorporates by reference the disclosure of said U.S. patent.

For certain applications (usually inline 4-cylinder and 6-cylinder engines), however, the torque pulses may not be of sufficient magnitude for actuation of a VCT system according to U.S. Pat. No. 5,002,023. In these cases the torque pulses must be amplified to be utilized effectively.

SUMMARY OF THE INVENTION

According to the present invention there is provided a camshaft for an internal combustion engine which substantially increases the torque pulses that the camshaft experiences during its normal operation. A camshaft according to the present invention incorporates an extra cam, that is, one more cam than the number of engine valve operating cams which are incorporated in the camshaft. The extra cam has a configuration which is supplementary to the effective composite configuration of the cams that are engaged by the engine valve operating cam followers, and the extra cam is followed by an extra spring loaded cam follower, that is, a cam follower that does not operate one of the engine valves. The configuration of the extra cam of the camshaft is such that the torque pulses which result from its engagement with the extra follower are substantially synchronous, consistent in direction with respect to the torque pulses which result from the operation of the engine valves, and of any desired amplitude.

Accordingly, it is an object of the present invention to provide an improved camshaft for use in a mechanical system. More particularly, it is an object of the present invention to provide an improved camshaft for an internal combustion engine. Even more particularly, it is an object of the present invention to provide a camshaft for an internal combustion engine which experiences net torque pulses of substantially increased magnitude during its normal operation.

For a further understanding of the present invention and the objects thereof, attention is directed to the drawings and the following brief description thereof, to the detailed description of the preferred embodiment of the invention, and to the appended claims.

DETAILED DESCRIPTION OF THE PREFERRED EMBODIMENT

Figure 1A:
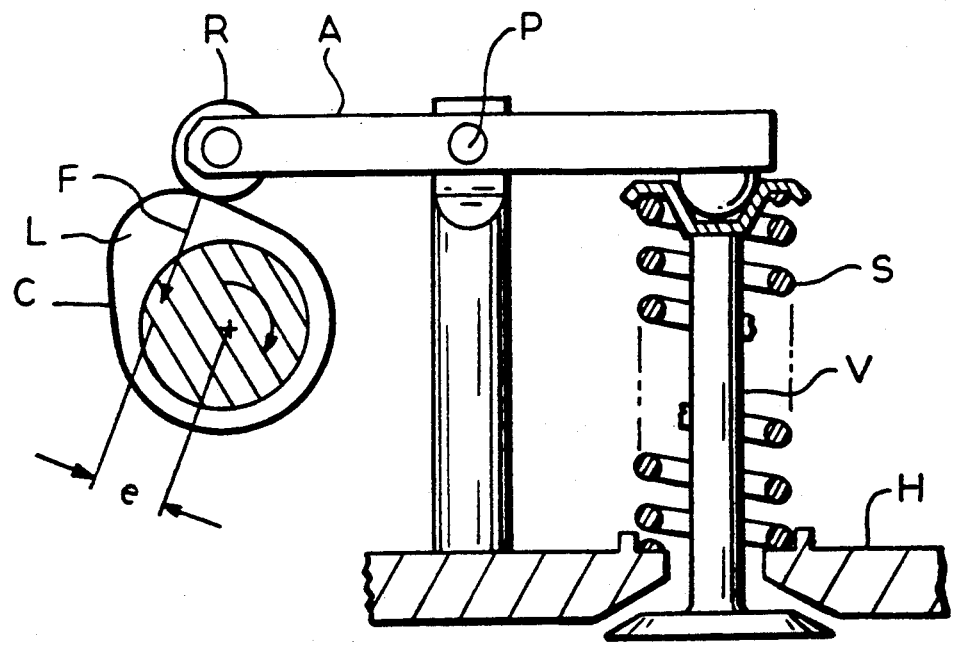
FIGS. 1A and 1B are schematic views illustrating the contact at different points during the rotation of a camshaft between a single-lobe cam of the camshaft and a roller type follower for operating an engine valve.
Figure 1B:
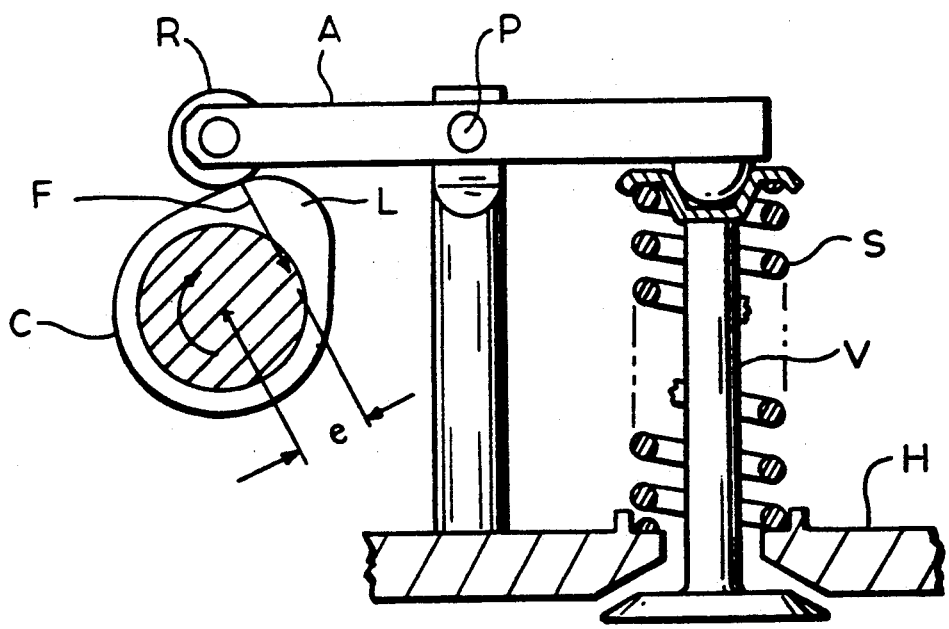

FIGS. 1A and 1B illustrate the interaction that occurs between a single-lobe cam C and a roller R that follows the cam as the camshaft rotates about its axis. The follower member that mounts the roller R is spring loaded by a spring S so as to urge the roller R into contact with the cam C. In the implementation depicted in FIGS. 1A and 1B, the cam C is used to operate an engine valve by a rocker arm A that mounts the cam-following roller R at one end and engages the end of a valve stem V at the other end. A pivot P for the rocker arm is fixed with respect to the cylinder head H, and the valve spring S is trapped between the cylinder head H and the end of the rocker arm A opposite the roller R and is in continuous compression so as to maintain contact of the roller R with the cam C during a cam cycle.

Assuming negligible friction, which is a valid assumption for an engine with roller cam followers, the contact force of a roller brought to bear on a cam is a force perpendicular to the local contact surface of the cam. This is shown in FIG. 1A for the case where the roller R has started up the flank of the rise side of the lobe L of the cam C. The moment arm of the contact force F is distance "e" measured from the camshaft axis, and the resulting moment is given by the product F×e, a moment opposing the rotation of the camshaft. The convention adopted here is to define this as a positive torque. With further rotation of the cam C the roller R reaches the high point of the lobe L, the contact force vector intersects the camshaft axis, and the moment arm "e" goes to zero. At this point the moment or torque is zero, and with further rotation of the camshaft the torque changes polarity as shown in FIG. 1B.

In FIG. 1B, the camshaft has rotated until the roller R starts down the fall side of the lobe L. Then the moment produced by the contact force is −F×e, opposite in direction to that of the moment produced in FIG. 1A, and acting in the direction of camshaft rotation. With further camshaft rotation the roller R reaches the base circle of the cam and the moment again goes to zero and stays there until continued rotation brings the lobe L again into play.

Friction losses in an engine are reduced by using roller type followers for the cams on a camshaft. This practice reduces the continuous drag torque acting on a rotating camshaft.

Figure 2:
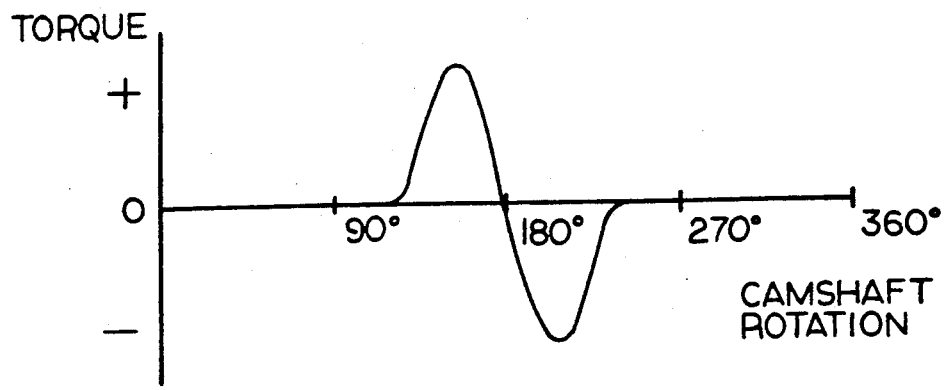
FIG. 2 is a graph of the torque pulse experienced by the camshaft of FIGS. 1A and 1B over a cycle of operation of the camshaft.

For a camshaft such as that shown in FIGS. 1A and 1B carrying a single cam C with roller follower R, the variation in the torque experienced by the camshaft as it rotates through a complete 360° cycle is illustrated by the curve in FIG. 2 in which the horizontal axis represents torque. The practically constant, frictional level of torque has been neglected in this figure and in those that follow.

Figure 3:
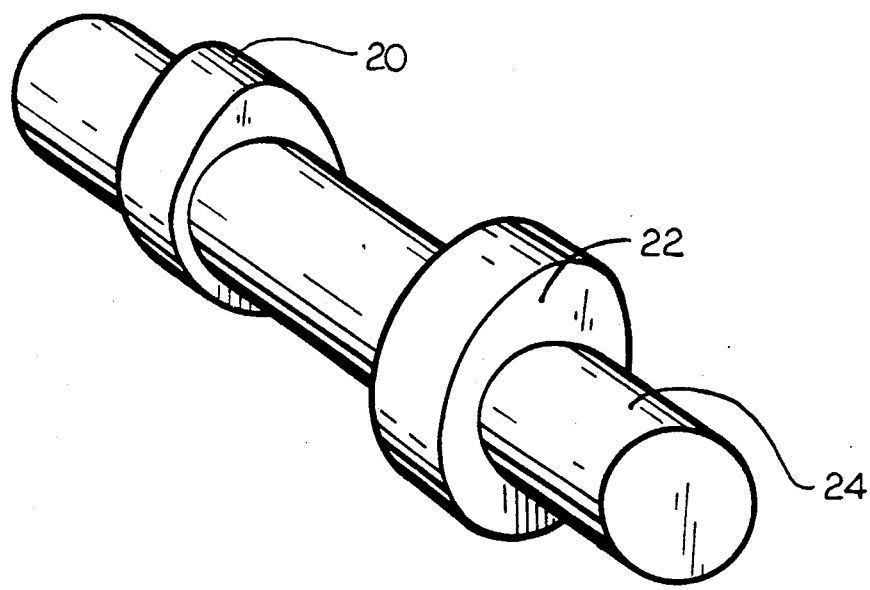
FIG. 3 is an isometric drawing of a camshaft having an operating cam and a supplementary, torque amplifying cam.

For a cam that produces the torque pulse illustrated in FIG. 2, a supplementary cam can be devised that will produce a synchronous pulse, consistent polarity, and of any desired amplitude. Such a cam 20 and its supplementary cam 22 are shown mounted together on a shaft 24 in FIG. 3. By correctly indexing the supplementary cam 22 on the camshaft and suitably loading it with a spring loaded roller, an effective amplification of the torque acting on the camshaft is obtained. The net torque resulting from valve-operating cams, plus the supplementary cam, is sufficient for actuation of a VCT system according to U.S. Pat. No. 5,002,023.

For the cam C as illustrated in FIGS. 1A and 1B, the base circle is at the minimum radius of the cam and the lobe of the cam is at its maximum radius. Similarly, the base circle of its supplementary cam is at its minimum radius, and the region of maximum radius corresponds to the lobe of the supplementary cam.

Figure 4:
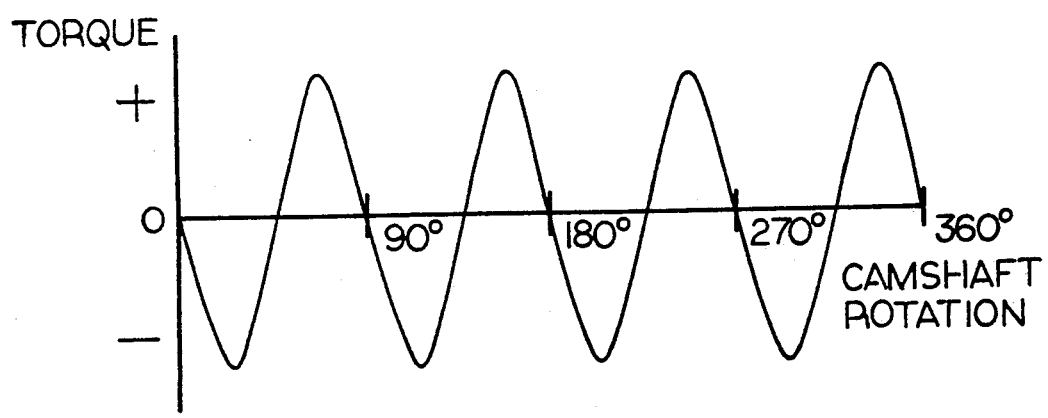
FIG. 4 is a graph illustrating the torque pulsation pattern experienced by a camshaft of a dual overhead camshaft, 4-cylinder engine over one camshaft cycle.

A camshaft from a DOHC 4-cylinder engine has 4 cams spaced at 90° intervals. The pattern of FIG. 2 is repeated four times per cam cycle. Since this pattern extends beyond 90° of cam angle, some merging of the pulses will occur. Thus, during one rotation of such a camshaft a series of four sine-like sub-cycles of torque pulses will result as illustrated in FIG. 4.

Figure 5:
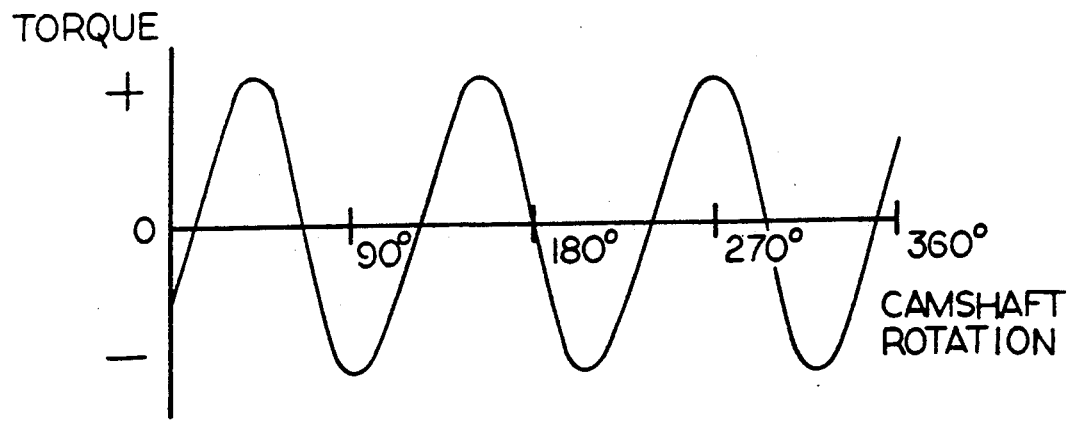
FIG. 5 is a graph illustrating the torque pulsation pattern experienced by a camshaft of a dual overhead camshaft, V-6 engine over one camshaft cycle.

For a DOHC V-6 engine a camshaft has three cams spaced at 120° intervals. The torque pulse pattern for such a camshaft as shown in FIG. 5 and consists of three pulses over one revolution of the camshaft.

Figure 6:
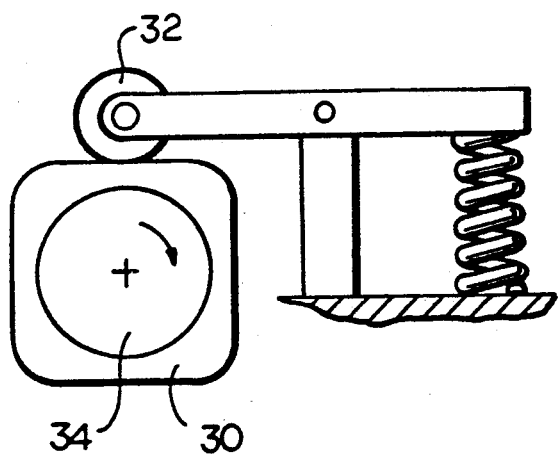
FIG. 6 is an end view of a supplementary, torque amplifying cam for a dual overhead camshaft, 4-cylinder engine, with a spring loaded, pivoted roller follower.

A torque amplifying cam 30 for a DOHC 4-cylinder engine is a 4-lobe cam, as shown in FIG. 6 along with its pivoting spring-loaded roller follower 32. Such a cam is used to generate the supplementary torque pattern shown in FIG. 4 and when included on its camshaft 34, effectively results in a substantial increase in net torque.

Figure 7:
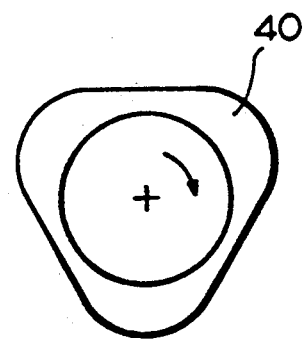
FIG. 7 is an end view of the contour of a supplementary torque amplifying cam for a dual overhead camshaft, V-6 engine, for use with a spring-loaded roller follower.

For a DOHC V-6 engine a torque amplifying supplementary cam 40 is, correspondingly, a 3-lobe cam as illustrated in FIG. 7. The cam 40 is designed to provide a substantial increase in the torque pattern shown in FIG. 5, and its operation is entirely analogous to that depicted and discussed above for a 4-cylinder engine.

Figure 8:
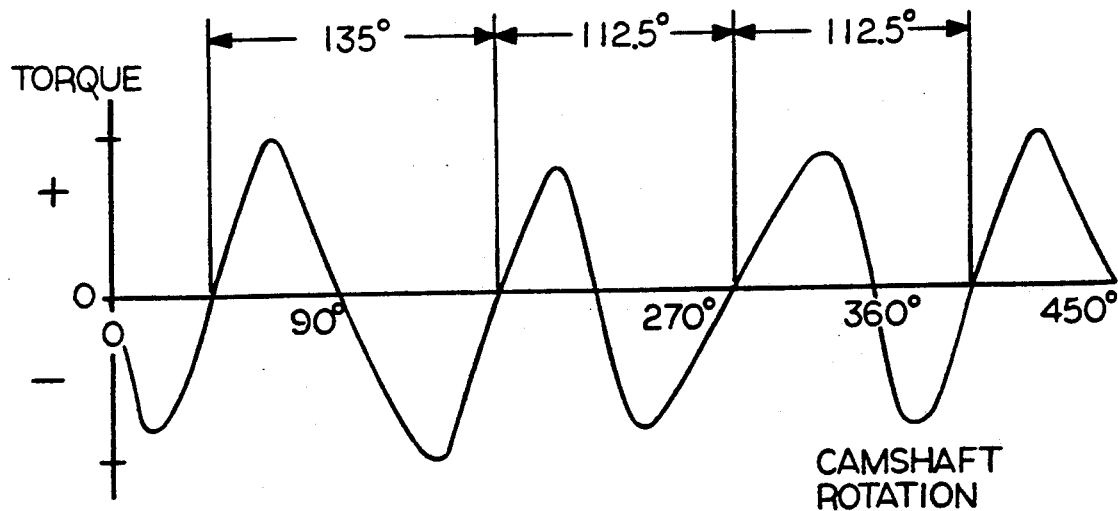
FIG. 8 shows the torque pulsation pattern experienced by a normal camshaft of a dual overhead camshaft, V-8 engine equipped with roller cam followers.

FIG. 8 shows the torque pattern for a camshaft of a DOHC V-8 engine with roller type cam followers, taken from test results. The geometry of this engine results in unequal valve operating intervals for the valves operated by any one camshaft. There will always be two valves that operate only 45° apart in the camshaft cycle. The result of this is a considerable overlapping of the pulses from these two valves. The observed result is a coalescence into a single pulse. Therefore, the torque pulsation pattern for the full camshaft consists of a series of three somewhat irregular pulses per revolution of the camshaft, as shown in FIG. 8. Such torque pulsations may not normally be of sufficient magnitude for actuation purposes described in U.S. Pat. No. 5,002,023, especially in inline 4-cylinder and 6-cylinder applications.

Figure 9:
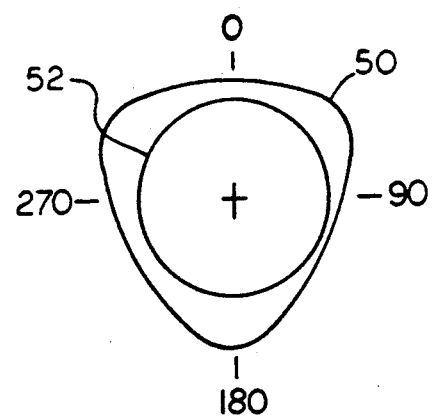
FIG. 9 is an end view of the contour of a torque amplifying cam for a dual overhead camshaft, V-8 engine, for use with a spring loaded roller follower.
Figure 10:
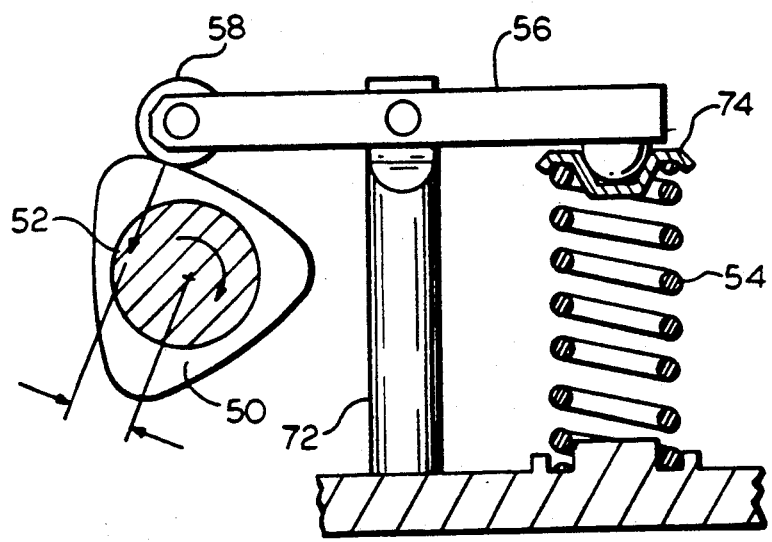
FIG. 10 is a schematic view illustrating the engagement of the supplementary cam of FIG. 9 with its cam follower.
Figure 11:
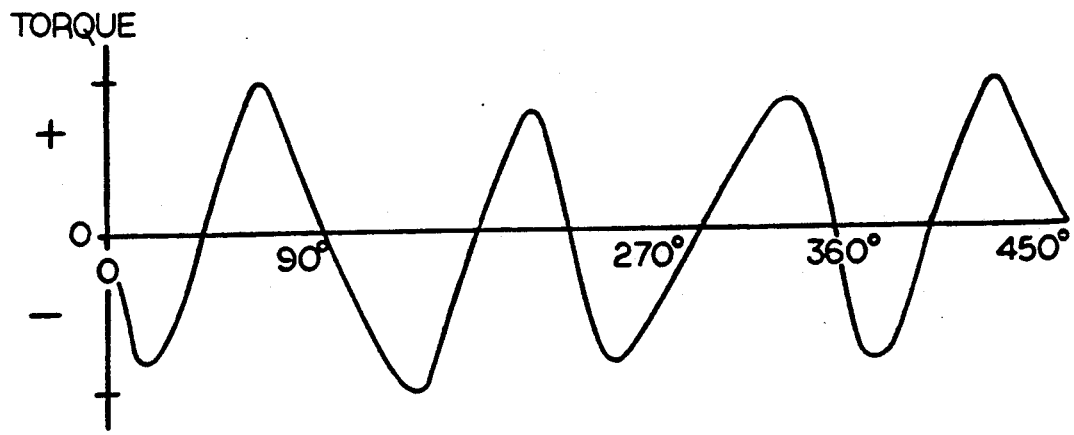
FIG. 11 is a graph of the torque pulsation pattern applied to its camshaft by the supplementary cam and cam follower of FIG. 10.
Figure 12:
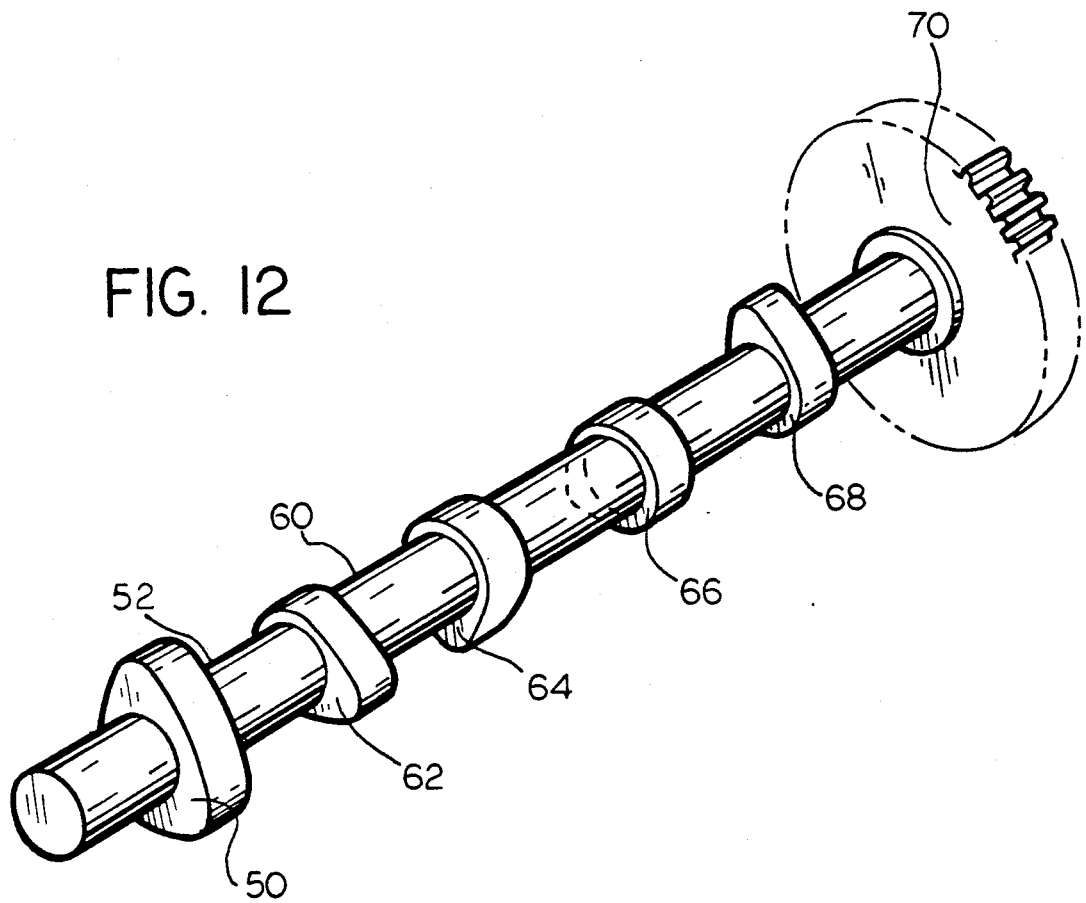
FIG. 12 is a perspective view illustrating a preferred embodiment of a camshaft according to the present invention for a dual overhead camshaft, V-8 engine.

The nature of a single torque amplifying, supplementary cam 50 for a DOHC V-8 is a 3-lobe cam to be added to a camshaft 52 as shown in FIG. 12. The profile of such a cam is shown in FIG. 9. Loading of the supplementary cam 50 by a spring 54, pivoting arm 56, and rollers 58 is shown in FIG. 10. The torque history for the cam 50 is deduced under the same considerations described in the discussion of FIGS. 1A and 1B. During a cam cycle there will be 6 points at which the torque will be zero, 3 at the tops of the three lobes, and 3 at the 3 low points on the cam 50. Between pairs of adjacent null points the torque will be in the positive direction when the roller follower 58 operates on the rising face of a lobe and in the negative direction when the roller follower 58 operates on the fall face of the lobe. The supplementary cam is designed so that the torque history it contributes to the camshaft, depicted in FIG. 11, amplifies the aggregate torque pattern of the engine operating valves which is shown in FIG. 8.

Illustratively, in a dual overhead camshaft V-8 engine, each camshaft is required to operate one valve for each of four cylinders of the engine. Thus, such a camshaft carries four cams for operating the four valves of the four cylinders, one valve per cylinder. The valve operating cams of the camshaft are spaced apart from one another along the length of the camshaft and are circumferentially offset from one another to provide for the firing of the various cylinders in a proper sequence and at proper intervals. Because of the fact that a camshaft of the foregoing character has four valve operating cams, each of which sequentially imparts positive and negative torque pulses to the camshaft, the net torque which is experienced by the camshaft and by the various mechanical elements that are involved in its operation will be a composite of the torque pulses of the individual valve operating cams.

FIG. 12 further illustrates the camshaft 52 which has been designed for use in operating the intake valves of four cylinders in a bank of cylinders of a dual overhead camshaft V-8 engine. The camshaft 52, whose position relative to the camshaft for operating the exhaust valves of the same cylinders and to the crankshaft of the engine, both not shown, is preferably phase adjusted by means as disclosed by U.S. Pat. No. 5,002,023, to enhance engine performance, comprises an elongate shaftlike portion 60 with four intake valve operating cams 62, 64, 66 and 68, respectively. The cams 62, 64, 66, and 68 are formed integrally in a single piece with the shaftlike portion 60 and are spaced apart from one another in a series along the shaftlike portion 60. The camshaft 52 is rotatable about the longitudinal central axis of the shaftlike portion 60. In that regard, a generally circular drive sprocket 70 is keyed to the shaftlike portion 60 of the camshaft 52 to permit rotational movement to be imparted thereto by a timing chain, not shown.

As previously explained, the engagement of the cams 62, 64, 66, and 68 with their respective spring loaded cam followers will tend to impart a series of three, sine-like torque pulses to the camshaft 52, the drive sprocket 70, and the chain which engages it. In accordance with the present invention, however, net torque is substantially increased by providing the camshaft 52 with the supplementary cam 50 which is also formed integrally in a single piece therewith. The supplementary cam 50 is positioned near an end of the shaftlike portion 60 of the camshaft 52, away from the drive sprocket 70. As is shown in FIG. 10, the supplementary cam 50 is adapted to be followed by a roller cam follower 58 which is rotatingly attached to an end of the lever 56. The lever 56 is pivotally attached to a fixed support 72 at a location between the ends of the lever. The other end of the lever 56 has a resilient force imparted thereto by the spring 54, which acts on a shaped contactor 74, so that the roller 58 is constantly resiliently urged against the supplementary cam 50 throughout its rotation with the camshaft 52. The supplementary cam 50 is a supplement to the composite of cams 62, 64, 66, 68, that is, it will introduce torque pulses into the camshaft 52 which are, substantially coincident or synchronous in timing, consistent in polarity with the torque pulses which are introduced by the cams 62, 64, 66, 68, and of any desired amplitude. Thus, the resulting torque which is experienced by the sprocket 70 and the timing chain that drives it will be substantially increased. It is noted that there is some irregularity to the contour of the supplementary cam 50 as the torque pulses from the cams 62, 64, 66, 68 will not be exactly equal in magnitude.

Figure 13:
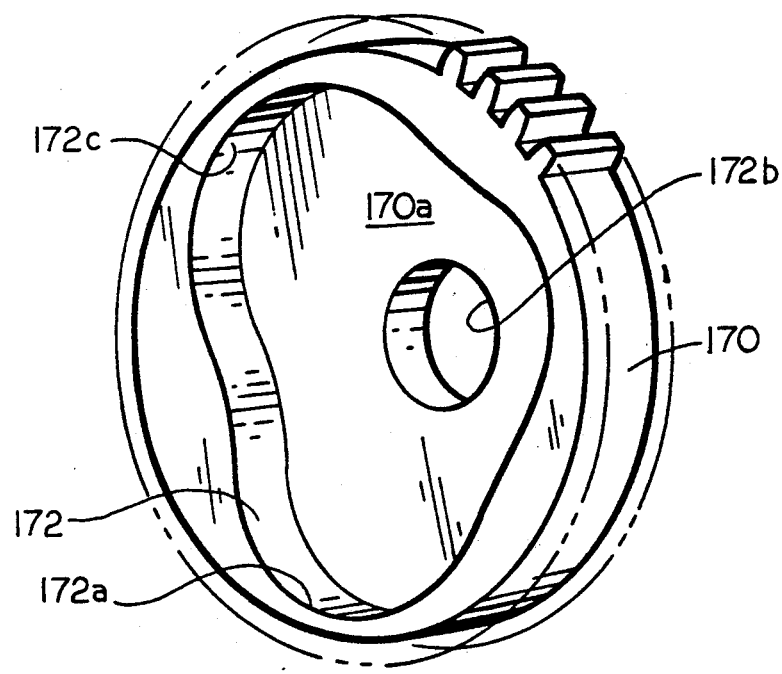
FIG. 13 is a perspective view of a camshaft drive sprocket for an alternative embodiment of the present invention.

FIG. 13 illustrates an alternative embodiment of a drive sprocket 170 for use in the practice of the present invention with an otherwise conventional camshaft, not shown. The drive sprocket 170 has an open portion 170a which has an inwardly facing cam surface 172 with three radially outwardly projecting lobes 172a, 172b, and 172c. A spring loaded, radially acting cam follower, not shown, is positioned to follow the contour of the cam surface 172, and in doing so, will introduce three torque pulses into the camshaft that the drive sprocket 170 is attached to during each rotation of the camshaft. Thus, the use of the drive sprocket 170 in place of the drive sprocket 70 makes it possible to eliminate the supplementary cam 50 without eliminating its function, namely the function of introducing torque pulses into a rotating camshaft which substantially amplify the torque pulses introduced therein by its valve operating cam lobes.

The present invention has been described in relation to a preferred embodiment in the form of a camshaft for operating a valve of each of the cylinders of a bank of cylinders in a dual overhead camshaft engine. It is contemplated, however, that the principle of the preferred embodiment, namely the principle of amplifying torque pulsations in a camshaft by providing an extra, supplementary cam which is a supplement to one or more of the operating cams carried by the camshaft, with a suitable biased cam follower to follow the supplementary cam to thereby introduce torque pulsations into the camshaft which are synchronous with, and consistent in direction with respect to the torque pulsations introduced by the operating cam(s), can be applied in any mechanical system which utilizes an operating cam on a camshaft. Further, in an automotive application of the principle of the invention, it is contemplated that it can be applied to camshafts other than those used in 1 intake, 1 exhaust valve per cylinder engines, particularly those having 2 or more intake or exhaust valves per cylinder.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A torque amplifying camshaft for operating a cam follower in a mechanical system, said cam follower being resiliently biased toward said camshaft, said camshaft comprising:

a shaftlike portion, said shaftlike portion having a central axis and being rotatable around said central axis;

an operating cam carried by said shaftlike portion and being rotatable therewith, said operating cam being adapted to be followed by an operating cam follower and having an outwardly projecting nose portion which is adapted to impart periodic to and fro motion to the operating cam follower; and supplementary cam means, said supplementary cam means being rotatable with said shaftlike portion and having a supplementary cam surface, said supplementary cam surface being adapted to be followed by a supplementary cam follower which is resiliently biased toward said camshaft, said supplementary cam surface of said supplementary cam means having a portion which is positioned circumferentially of said central axis relative to said operating cam, to introduce, upon the rotation of the camshaft, a torque pulse into said camshaft which is substantially synchronous with and consistently directed with respect to the torque pulse which is introduced as a result of the following of the operating cam by the operating cam follower.

2. A camshaft according to claim 1 wherein said shaftlike portion and said operating cam are formed integrally in a single piece.

3. A camshaft according to claim 1 wherein said supplementary cam means comprises a cam, said cam being rotatable with said shaftlike portion, and wherein said supplementary cam surface faces outwardly.

4. A camshaft according to claim 2 wherein said supplementary cam means comprises a cam which is formed integrally in a single piece with said shaftlike portion and said operating cam.

5. A camshaft according to claim 1 and further comprising generally circular drive means non-rotatably affixed to said shaftlike portion for imparting rotational movement to said camshaft about said central axis.

6. A camshaft according to claim 5 wherein said supplementary cam means comprises a portion of said generally circular drive means, said supplementary cam surface being inwardly facing.

7. A torque amplifying camshaft for operating a valve for each of a plurality of cylinders of an internal combustion engine, said camshaft comprising:
   an elongate shaftlike portion, said camshaft being rotatable about the longitudinal central axis of said shaftlike portion;
   a plurality of valve operating cams spaced apart from one another along said shaftlike portion, each of said valve operating cams being rotatable with said shaftlike portion and having an outwardly projecting portion which is adapted to be engaged by a cam follower for the valve for one of the cylinders, the cam follower being resiliently biased toward said camshaft, the outwardly projecting portions of the plurality of valve operating cams being circumferentially offset from one another with respect to the axis of rotation of said camshaft; and
   supplementary cam means, said supplementary cam means being rotatable with said camshaft and having a supplementary cam surface with a plurality of circumferentially spaced apart, outwardly projecting portions, said supplementary cam surface of said supplementary cam means being adapted to be followed by a supplementary cam follower as said camshaft rotates to introduce torque pulses into said camshaft which are substantially synchronous with and consistently directed with respect to the torque pulses which are introduced by said plurality of valve operating cams as a result of the engagement between each of said plurality of valve operating cams and the cam follower which engages said each of said plurality of valve operating lobes.

8. A camshaft according to claim 7 wherein said elongate shaftlike portion and each of said plurality of valve operating cams are formed integrally in a single piece.

9. A camshaft according to claim 7 wherein said supplementary cam surface of said supplementary cam means has three outwardly projecting portions.

10. A camshaft according to claim 9 wherein said plurality of valve operating cams consist of three valve operating cams.

11. A camshaft according to claim 9 wherein said plurality of valve operating cams consist of four valve operating cams.

12. A camshaft according to claim 7 and further comprising:
   generally circular drive means non-rotatably affixed to said elongate shaftlike portion for imparting rotational movement to said camshaft about the longitudinal central axis of said shaftlike portion.

13. A camshaft according to claim 7 wherein said supplementary cam means comprises a supplementary cam, said supplementary cam being rotatable with said shaftlike portion, and wherein said supplementary cam surface faces outwardly.

14. A camshaft according to claim 13 wherein said cam is positioned adjacent to an end of said shaftlike portion.

15. A camshaft according to claim 8 wherein said supplementary cam means comprises a supplementary cam which is formed integrally in a single piece with said elongate shaftlike portion and each of said plurality of valve operating cams.

16. A camshaft according to claim 15 wherein said supplementary cam surface faces outwardly.

17. A camshaft according to claim 16 wherein said supplementary cam is positioned adjacent to an end of said shaftlike portion.

18. A camshaft according to claim 17 and further comprising generally circular drive means non-rotatably affixed to said shaftlike portion adjacent to the other end thereof for imparting rotational movement to said camshaft about the longitudinal central axis of said shaftlike portion.

19. A camshaft according to claim 18 wherein said supplementary cam means comprises a portion of said generally circular drive means, said supplementary cam surface being inwardly facing.

20. In combination:
   a camshaft for operating a valve for each of a plurality of cylinders of an internal combustion engine, said camshaft comprising:
   an elongate shaftlike portion, said camshaft being rotatable about the longitudinal central axis of said shaftlike portion;
   a plurality of valve operating cams spaced apart from one another along said shaftlike portion, said plurality of valve operating cams being equal in number to the number of the plurality of cylinders, each of said valve operating cams being rotatable with said shaftlike portion and having an outwardly projecting portion which is adapted to be engaged by a cam follower for the valve for one of the cylinders, the cam follower being resiliently biased toward said camshaft, the outwardly projecting portions of the plurality of valve operating cams being circumferentially offset from one another with respect to the axis of rotation of said camshaft, and
   supplementary cam means, said supplementary cam means being rotatable with said camshaft and having a supplementary cam surface with a plurality of circumferentially spaced apart, outwardly projecting portions, said supplementary cam surface of said supplementary cam means being adapted to be followed by a supplementary cam follower as said camshaft rotates to introduce torque pulses into said camshaft which are substantially synchronous with and consistently directed with respect to the torque pulses which are introduced by said plurality of valve operating cams as a result of the engagement between each of said plurality of valve operating cams and the cam follower which engages said each of said plurality of valve operating lobes;
   supplementary cam follower means comprising contactor means for following said supplementary cam surface of said supplementary cam means as said shaftlike portion rotates; and
   biasing means having a fixed end which is fixedly positioned with respect to an engine block of the internal combustion engine, said biasing means resiliently biasing said supplementary cam follower means against said supplementary cam surface.

21. A combination according to claim 20 wherein said elongate shaftlike portion and each of said plurality of valve operating cams are formed integrally in a single piece.

22. A combination according to claim 18 wherein said supplementary cam surface of said supplementary cam means has three outwardly projecting lobe portions.

23. A combination according to claim 22 wherein said plurality of valve operating cams consists of three valve operating cams.

24. A combination according to claim 22 wherein said plurality of valve operating cams consists of four valve operating cams.

25. A combination according to claim 20 and further comprising:

generally circular drive means non-rotatably affixed to said elongate shaftlike portion for imparting rotational movement to said camshaft about the longitudinal central axis of said shaftlike portion.

26. A combination according to claim 20 wherein said supplementary cam means comprises a supplementary cam, said supplementary cam being rotatable with said shaftlike portion, and wherein said supplementary cam surface faces outwardly.

* * * * *